United States Patent [19]

Nelson et al.

[11] 3,797,299

[45] Mar. 19, 1974

[54] METHOD OF MEASURING THE TRITIUM CONCENTRATION IN A HIGH-TEMPERATURE ENVIRONMENT

[75] Inventors: Paul A. Nelson, Wheaton; Romesh Kumar, Hinsdale, both of Ill.

[73] Assignee: The United States of America as represented by the United States Atomic Energy Commission, Washington, D.C.

[22] Filed: Apr. 23, 1973

[21] Appl. No.: 353,256

[52] U.S. Cl. .................................. 73/19, 324/33
[51] Int. Cl. ............................................ G01n 7/10
[58] Field of Search ................ 73/19, 23; 324/33; 176/19 R

[56] References Cited
UNITED STATES PATENTS

| | | | |
|---|---|---|---|
| 2,861,450 | 11/1958 | Ransley | 73/19 |
| 3,525,642 | 8/1970 | Ross | 73/23 X |
| 3,649,473 | 3/1972 | Holden et al. | 324/33 X |
| 3,683,272 | 8/1972 | Vissers et al. | 73/19 X |
| 3,731,523 | 5/1973 | Vissers et al. | 73/23 X |

OTHER PUBLICATIONS

Physical Review B, Diffusion of H2D2 and T2, Katz et al.; Vol. 4, No. 2, 7-15-71, pg. 330.
Transactions American Nuclear Society, A Hydrogen Activity Meter for LMFBR, Vissers et al.; Vol. 14-2, Oct. 1971, pg. 610.

Primary Examiner—Richard C. Queisser
Assistant Examiner—Stephen A. Kreitman
Attorney, Agent, or Firm—John A. Horan; Arthur A. Churm; John Isaac

[57] ABSTRACT

This invention deals with a novel method for measuring the tritium concentration in a high-temperature environment such as liquid metal. An enclosed, thin-wall metal membrane is connected to a sweep gas source containing hydrogen in an inert carrier gas, the membrane being formed from a metal substantially inert to the high-temperature environment and through which elemental hydrogen and tritium will diffuse. The outer surface of the metal membrane is then contacted with the high-temperature environment, and the interior surface of the membrane is contacted and swept by the sweep gas, whereby tritium atoms diffusing through the walls of the membrane react with the hydrogen in the sweep gas at the interior surface of the membrane to form gaseous hydrogen tritium molecules which are immediately swept away from the membrane's interior surface. The sweep gas containing the gaseous hydrogen-tritium molecules is continuously removed from the enclosed membrane and measured for tritium radioactivity, the radioactivity measurement being indicative of the tritium concentration in the high-temperature environment.

10 Claims, 4 Drawing Figures

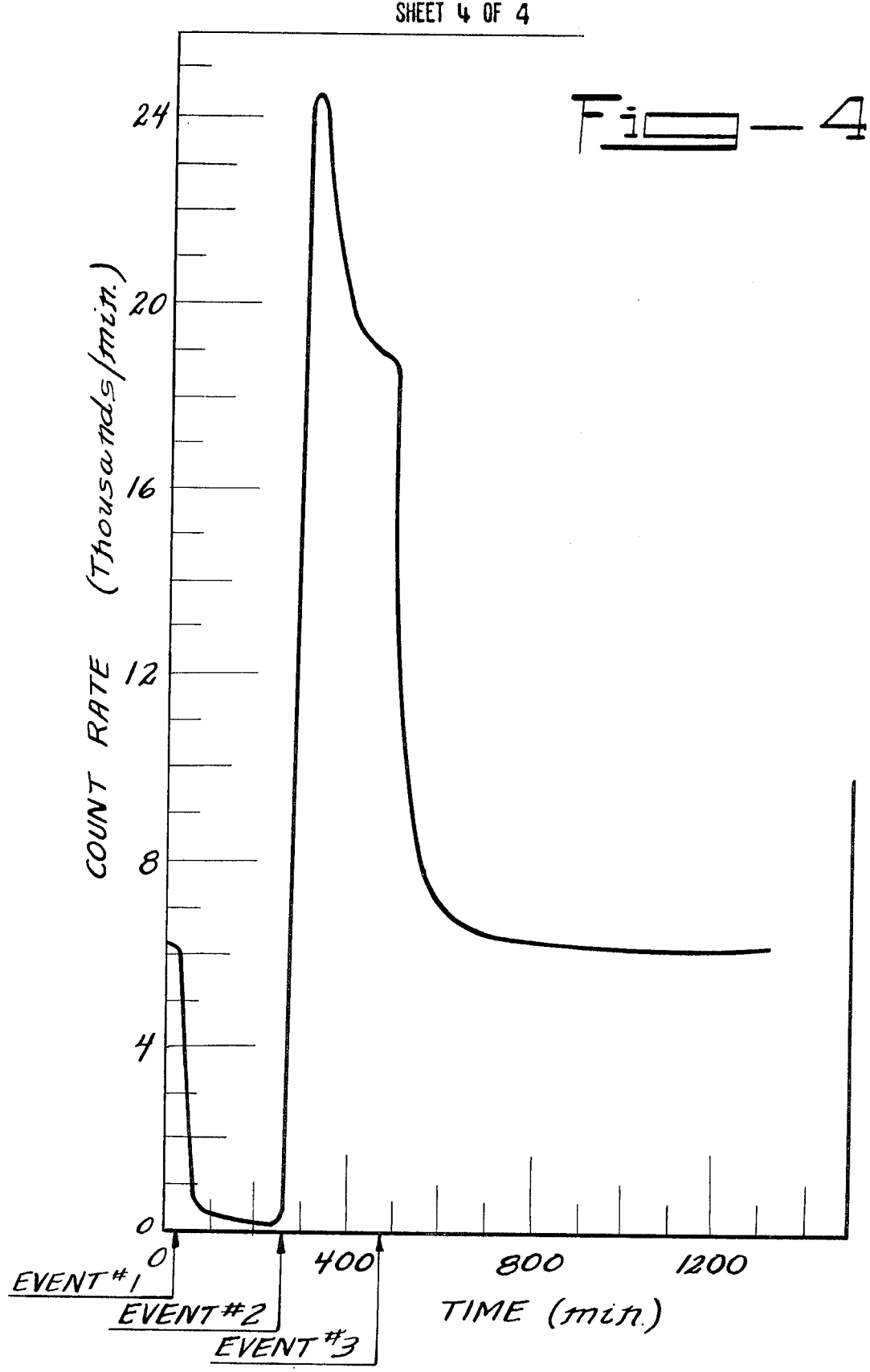

METHOD OF MEASURING THE TRITIUM CONCENTRATION IN A HIGH-TEMPERATURE ENVIRONMENT

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the measurement of tritium in a high-temperature environment. More specifically, it relates to a method for measuring the tritium concentration in the liquid sodium coolant and cover gas of a liquid-sodium-cooled nuclear reactor.

The development of liquid-sodium-cooled nuclear reactors has generated a great deal of concern regarding the type and levels of impurities present in the liquid sodium coolant. One such area of concern is the tritium level in the sodium coolant system. In such a reactor, tritium is produced by ternary fission in the fuel and by neutron activation of boron in the tetraboron carbide control rods by the reaction $^{10}B$ $(n,2\alpha)$ T. Tritium, which is so generated, diffuses rapidly through most metals and alloys, resulting in the transport of tritium throughout the entire reactor system. A large fraction of the tritium that is generated is released to the primary sodium coolant. The concentration of the tritium, as well as hydrogen, in the sodium coolant can be kept at a minimum by removing the tritium and hydrogen therefrom by cold-trapping. However, in order to study and monitor the effectiveness of the cold-trapping, knowledge of the tritium concentration in the sodium coolant is essential.

Prior to the present invention, there has been no really efficient method of determining the tritium concentration in liquid sodium. The most commonly used method is to isolate samples of the sodium, allow the excess sodium radioactivity to decay for about 5 days and then analyze the sample for tritium concentration. This method has proven to be rather cumbersome and time-consuming. In addition, it is not as precise or as sensitive as desired. Furthermore, it is desirable to be able to continuously monitor the tritium concentration in the liquid sodium, and previous methods have proven to be unable to perform such a function.

The present invention has been found to be an effective method for continuously determining the tritium concentration in the liquid sodium coolant of a nuclear reactor. In addition, this method is applicable to tritium determination in the cover gas of such a reactor as well as to other molten metal and high-temperature environments. This method is based on the diffusion of tritium and hydrogen atoms through a permeable metal membrane such as iron or nickel which is immersed in the liquid sodium or other high-temperature environment. Upon diffusion through the membrane, the tritium atoms react with hydrogen present in a sweep gas within the interior of the membrane to form gaseous hydrogen-tritium molecules which are then swept out of the membrane. Previous hereto, it was thought that since the driving force for the diffusion of both tritium and hydrogen is the same, the use of hydrogen within the interior of such a membrane would, in fact, reduce the diffusion of tritium through the membrane since the diffusion of hydrogen through the membrane would be so reduced. The inventors, however, have found that the opposite occurs, that is that the use of hydrogen in the sweep gas within the interior of such a membrane enables one to maintain a maximum diffusion of tritium through the membrane. This results in a method which can precisely determine on a continuing basis even small concentrations of tritium in the sodium coolant and cover gas of a nuclear reactor. This enables one to efficiently control tritium levels in the sodium coolant as well as to control the resulting releases of tritium to the environment.

Therefore, it is one object of the present invention to provide a method of measuring the tritium concentration in a high-temperature environment.

It is another object of this invention to provide a method for continuously monitoring the tritium concentration in the liquid sodium coolant or cover gas of a liquid-sodium-cooled nuclear reactor.

Further objects and advantages of the invention will be apparent from the following detailed description of the present method.

SUMMARY OF THE INVENTION

In practicing the present invention, an enclosed, thin-wall metal membrane is connected to a sweep gas source which contains hydrogen in an inert carrier gas such as argon. The membrane is formed from a metal which is substantially inert to the environment into which it will be inserted as well as from a metal through which elemental hydrogen and tritium will diffuse, nickel being an example of such a metal. The membrane is inserted into the high-temperature environment so as to contact the outer surface of the enclosed membrane with the environment. The sweep gas is then introduced into the interior of the membrane so that it continually contacts and sweeps the interior surface of the membrane. Tritium atoms, diffusing through the walls of the membrane, react with the hydrogen in this gas at the interior surface of the membrane to form gaseous hydrogen-tritium molecules. The gaseous hydrogen-tritium is immediately swept away from the membrane's interior surface by the sweep gas, thereby maintaining the tritium concentration at the interior surface of the membrane near zero so as to obtain a maximum tritium diffusion through the wall of the membrane. The sweep gas containing the gaseous hydrogen-tritium is continually removed from the enclosed membrane and directed to an ionization chamber wherein the radioactivity of any tritium present in the gas is measured. This radioactivity measurement is indicative of the tritium concentration in the high-temperature environment into which the membrane has been inserted.

BRIEF DESCRIPTION OF THE DRAWINGS

FIG. 4 is a graph showing the changes in response of the present invention to changes in the hydrogen concentration in the sweep gas.

DETAILED DESCRIPTION OF THE INVENTION

Figure 1:
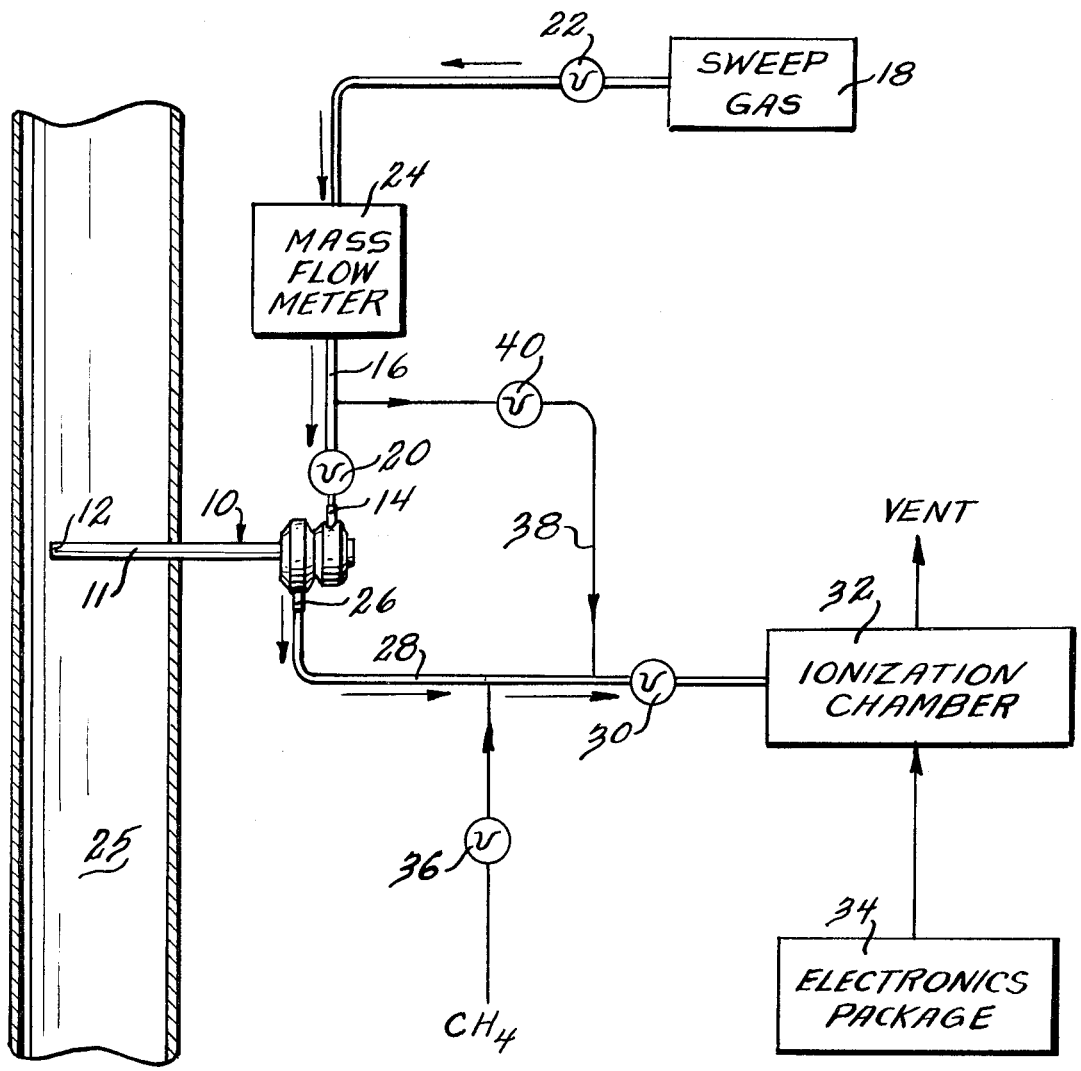
FIG. 1 is a schematic drawing illustrating one application of the present invention.

Turning first to FIG. 1, a tubular, thin-walled metal probe 10 having an outer surface 11, a closed end 12 and gas inlet means 14 is connected by way of gas line 16 to a sweep gas source 18. Inserted along gas line 16 are gas flow control valves 20 and 22 and mass flowmeter 24, which measures the rate of gas flow through line 16. Probe 10 is then inserted into a high-temperature environment 25, such as liquid sodium, so as to contact probe 10's outer surface 11 and closed end 12 with the high-temperature environment 25. With control valves 20 and 22 in an open position, a sweep gas consisting of hydrogen in an inert gas such as argon, which is contained within source 18, flows through gas line 16 and into probe 10 by way of inlet means 14. Tritium, present in high-temperature environment 25, diffuses through the walls of probe 10 and reacts with the hydrogen in the sweep gas to form gaseous hydrogen-tritium molecules. The sweep gas then sweeps away the hydrogen-tritium from the interior surface of probe 10, through outlet means 26 and into gas line 28. The gas in line 28 then proceeds through gas control valve 30 and into ionization chamber 32 wherein the gas is ionized, the radioactivity of any tritium present in the ionized gas being measured by electronics package 34. For purposes of ionizing the gas in chamber 32, methane is introduced through control valve 36 into line 28. In addition, purge line 38 and control valve 40 are utilized to purge the ionization chamber with pure sweep gas from source 18 whenever such purging is necessary.

The choice of inert gas for use with the hydrogen in the sweep gas contained within source 18 can be among any of the inert gases known to the art, such as nitrogen, argon and helium. It is preferred, however, to utilize argon in the present invention. In addition, the ionization chamber 32 along with the methane introduced into line 28 is merely one way of measuring the tritium radioactivity of the sweep gas. Any conventional means known to the art for measuring tritium radioactivity in the outlet gas from the probe can be utilized in the present invention.

Figure 2:
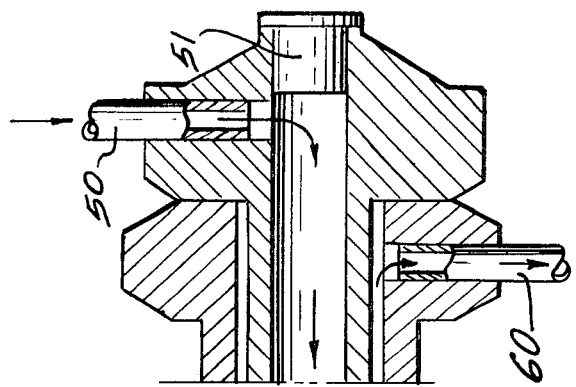
FIG. 2 is a sectional view of a probe utilized in practicing the present invention.
Figure 2:
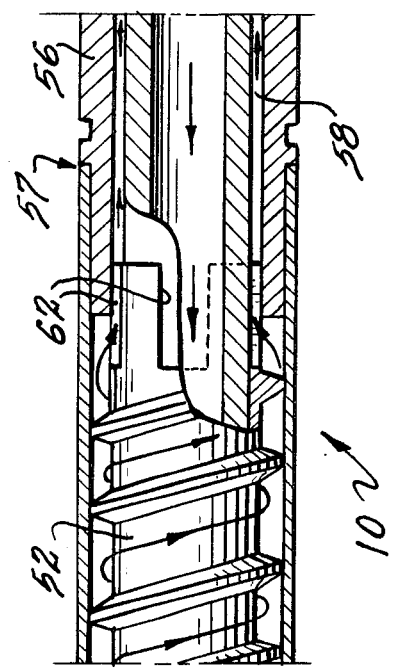
Figure 2:
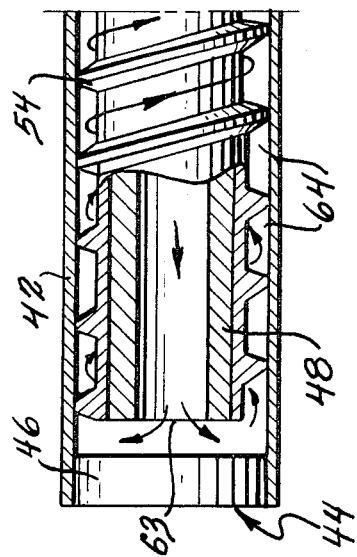

FIG. 2 illustrates one preferred embodiment of the enclosed metal membrane utilized in the present invention. As shown therein, metal probe 10 comprises a thin-wall metal tube 42 having a closed end 44 consisting of a metal plug 46 welded to tube 42. It is tube 42 which is the membrane contacted by the high-temperature environment and through which tritium diffuses. Mounted coaxially within the interior of tube 42 is a second tube 48 having a diameter smaller than that of tube 42. The interior end of tube 48 is spaced close to plug 46 while the exterior end of tube 48 extends beyond the outer end of tube 42 and is adapted to receive gas inlet tube 50 and to seal off the exterior end of tube 48 with plug 51. Encasing the portion of tube 48 which is enclosed by tube 42 is support sleeve 52. Sleeve 52 is adapted to slip-fit over the exterior of tube 48 and has on its exterior surface helical threads 54 which extend outwardly from the surface of sleeve 52 to contact the interior surface of tube 42. Tubular-shaped jacket 56 encases the portion of tube 48 which extends outwardly beyond tube 42, there being a space 58 between the exterior surface of tube 48 and the interior surface of jacket 56. Jacket 56 additionally abuts the end of tube 42 at junction 57 and extends into the interior of tube 42 so as to wedge between the interior surface of tube 42 and the exterior surface of sleeve 52 to securely position sleeve 52 in place. Jacket 56 is additionally adapted so as to receive gas outlet tube 60 which opens into space 58. In addition, the exterior end of sleeve 52 contains slots 62 which enable the passage of gas from the space between tube 42 and sleeve 52 into space 58.

In operating probe 10, hydrogen-argon gas from the gas source enters inlet 50 into the interior of tube 48. The gas passes down tube 48 and out of its interior end 63. The function of helical threads 54 is to create grooves 64 which provide a helical pathway along the outer surface of sleeve 52 for the gas. As the gas exits tube 48 at its interior end 63, it then passes back along the length of sleeve 52 through grooves 64 between the outer surface of sleeve 52 and the interior surface of tube 42. Due to the helical threads 54, the gas passes along grooves 64 so as to cause the gas to contact and sweep along the interior surface of tube 42. As the gas reaches the exterior end of sleeve 52, it passes through slots 62 into space 58 and then out of probe 10 by way of outlet tube 60. As the gas sweeps the interior surface of tube 42, tritium, which diffuses through the wall of tube 42, reacts with the hydrogen in the gas to form gaseous hydrogen-tritium molecules which are swept along with the sweep gas and out of probe 10.

It should be noted that the probe illustrated in FIG. 2 is merely one manner of construction. Any probe or membrane which will allow the diffusion of tritium therethrough and will enable the hydrogen-inert gas mixture to contact and sweep the interior surface thereof is within the scope of the present invention. Therefore, the present invention is not to be limited to the probe construction illustrated in FIG. 2.

As pointed out earlier, it had previously been thought that in order to increase the diffusion of tritium from the high-temperature environment into the interior of a membrane, the concentration of both tritium and hydrogen within the membrane should be as low as possible. The inventors, however, have discovered that the opposite in regard to hydrogen will, in fact, give the highest tritium diffusion. To better understood this particular point, one must look at various equilibriums which occur between tritium (T), hydrogen (H) and hydrogen-tritium (HT). To utilize an example wherein the probe is made of nickel and is inserted into a liquid sodium environment, the following equilibrium equations should be considered.

$$T_{(Na)} \rightleftarrows T_{(Ni-Na)} \qquad 1$$

$$H_{(Na)} \rightleftarrows H_{(Ni-Na)} \qquad 2$$

$$2\,HT_{(g)} \rightleftarrows T_{2(g)} + H_{2(g)} \qquad 3$$

$$K_1 = [HT]^2_{(g)}/[T_2]_{(g)}\,[H_2]_{(g)} \qquad 4$$

$$T_{2(g)} \rightleftarrows 2\,T_{(Ni-g)} \qquad 5$$

$$K_2 = [T]^2_{(Ni-g)}/[T_2]_{(g)} \qquad 6$$

wherein
- (Na) - represents the concentration in the sodium,
- (g) - represents the concentration in the sweep gas,
- (Ni-Na) - represents the concentration in the nickel probe membrane on the sodium side of the membrane,
- (Ni-g) - represents the concentration in the nickel probe membrane on the sweep gas side of the membrane,
- $K_1$ - is a constant, and
- $K_2$ - is a constant.

From equations (3) and (4), it can be seen that if the hydrogen in the sweep gas is increased considerably, then in order to maintain the constant $K_1$, the amount of tritium gas in the sweep gas will be decreased considerably to the point where there is very little, if any, tritium gas present therein. Therefore, almost all of the tritium present in the sweep gas will be in the form of HT. From equations (5) and (6), it can be seen that since the $T_2$ concentration in the sweep gas is near zero, the tritium concentration in the nickel on the gas side of the membrane will also be near zero. In addition, since the tritium concentration in the nickel on the sodium side of the membrane is in equilibrium with tritium in the sodium, equation (1), the tritium concentration in the nickel on the sodium side of the membrane will be considerably greater than the near zero concentration of the tritium in the nickel on the gas side of the membrane. As a result, a high tritium concentration gradient is achieved within the nickel membrane from the sodium side to the gas side, creating thereby a high diffusion rate of tritium from the sodium to the sweep gas. Furthermore, the rate of diffusion of tritium through the membrane and the concentration of tritium as HT in the sweep gas is directly proportional at a given sweep gas flow rate to the tritium concentration in the sodium when the sweep gas contains a high hydrogen concentration. Therefore, equation (7) can be applied to any tritium concentration in the sodium for high hydrogen-to-tritium ratios in the sweep gas.

$$R = HT_{(g)}/T_{(Na)} \qquad 7$$

wherein R is a constant for any given set of operating conditions. Thus, by measuring the amount of HT formed in the sweep gas, one can obtain the concentration of the tritium in the sodium, for the tritium, upon diffusion through the nickel membrane, reacts with the hydrogen present in the sweep gas in accordance with equation (8).

$$T_{(Ni-g)} + \tfrac{1}{2} H_{2(g)} \rightleftarrows HT_{(g)} \qquad 8$$

Figure 3:
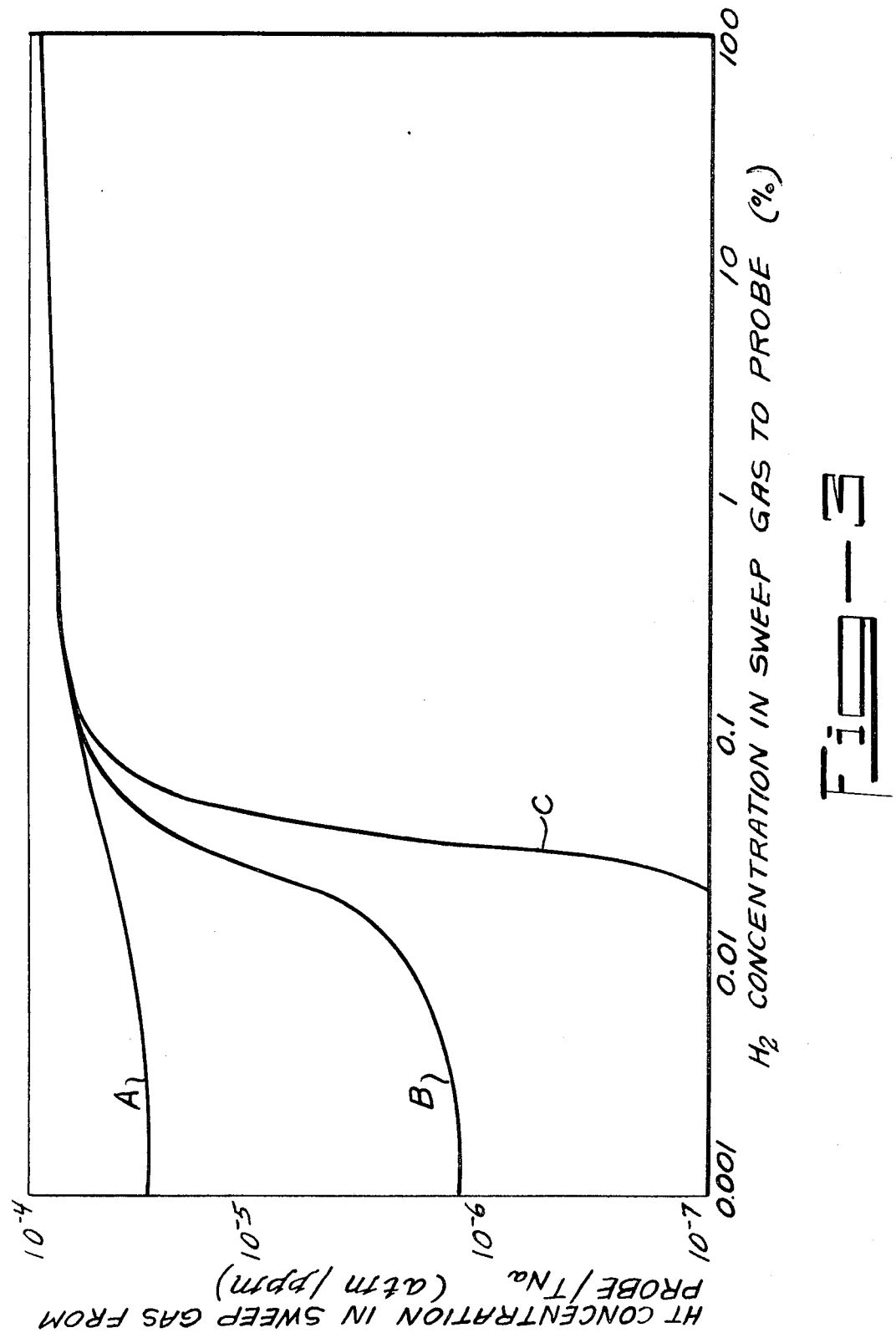
FIG. 3 is a graph illustrating the effect of various hydrogen concentrations in the sweep gas on the gaseous hydrogen-tritium concentration leaving the probe.

As can be seen from the above, one of the more important factors in the operation of the present invention is the concentration of hydrogen in the sweep gas. FIG. 3 shows the effect of the hydrogen concentration in the sweep gas on the hydrogen-tritium concentration in the gas leaving the probe for three different equilibrium hydrogen pressures in sodium, in atmospheres A being $10^{-4}$, B being $10^{-7}$ and C being $10^{-10}$. The tritium concentration in the sodium is the same for all three hydrogen partial pressures. As is seen from FIG. 3, when the hydrogen concentration in the sweep gas falls below 0.1 percent for specific operating conditions, then the amount of hydrogen-tritium formed in the interior of the probe is highly dependent on the hydrogen concentration in the sodium as well as being dependent on the tritium concentration in the sodium. This will be referred to as the equilibrium mode, since with low hydrogen concentrations in the sweep gas, the tritium and hydrogen in the sweep gas and the sodium proceed toward equilibrium. Where the hydrogen concentration in the sweep gas is greater than 0.1 percent, however, the amount of hydrogen-tritium formed in the interior of the probe is independent of the hydrogen concentration in the sodium and is directly proportional to the amount of tritium in the sodium. This is referred to as the dynamic mode. Furthermore, the amount of hydrogen-tritium formed in the probe increases slightly as the concentration of the hydrogen in the sweep gas increases from 0.1 percent to about 10 percent, whereafter further increases in the hydrogen concentration in the sweep gas make very little difference in the amount of hydrogen-tritium formed in the interior of the probe for any one particular concentration of tritium in the sodium. Therefore, the concentration of hydrogen in the sweep gas should be at least 0.1 percent and is preferred to be as high as 10 percent, with greater than 10 percent being unnecessary to the operation of the present invention.

One point that should be noted is that since the present method can be operated in both the dynamic and equilibrium modes, as stated above, it is theoretically possible to obtain the hydrogen as well as tritium concentration in the sodium. In the dynamic mode, the readout of HT in the sweep gas is proportional to the tritium in the sodium only, while the readout in the equilibrium mode is proportional to both hydrogen and tritium in the sodium. Therefore, the tritium concentration could be obtained from the dynamic mode, and with reference to this, the hydrogen concentration could then be obtained from the equilibrium mode. However, operation of the present method in the equilibrium mode would not be very practical in a reactor system, for the hydrogen concentration in the sodium coolant of such a reactor would be too low. Therefore, it is the dynamic mode which is preferred and is the more useful, since the concentration of HT in the sweep gas leaving the probe is relatively insensitive to variations in the hydrogen content of the sodium.

Another important variable in the proper operation of the present invention is the flow rate of the sweep gas to the probe. In order to insure that the rate of diffusion of the tritium through the probe membrane remains dependent only on the tritium concentration in the high-temperature environment, the flow rate must be within a certain range wherein the activity of the tritium in the sodium is inversely proportional to the gas flow rate. If the flow rate falls below this particular range, the concentration of tritium both inside and outside of the probe will proceed to equilibrium, resulting in the diffusion of the tritium through the probe membrane being dependent on both the concentration of the tritium as well as the hydrogen in the sodium. Therefore, the flow rate must be above this particular minimum rate. Also, if the flow rate becomes too high, the tritium in the form of hydrogen-tritium within the sweep gas leaving the probe becomes too dilute and therefore too difficult to accurately measure. Therefore, the referred sweep gas flow rate for the invention disclosed herein is 0.1 to 1.0 milliliters per second. It should further be noted, however, that the acceptable range of flow rate will also depend on the size of the probe utilized. If the robe size is either too large or too small, then the flow rate will become unreasonably large or small, resulting in inoperability of the present invention. The point of this relationship is that there is a probe size range wherein the flow rate becomes practical and also operates in accordance with the above disclosure.

One other factor which is also important to the proper operation of the present invention is the particular temperature at which the probe is operated. The temperature should be sufficiently high to obtain acceptable tritium diffusion rates through the particular probe membrane metal. It has been determined that the temperature should be at least 750°F. for a nickel probe, and the present invention using a nickel probe has been operated up to 1,200°F. with about 1,600°F. probably being the maximum operational temperature.

Regarding the probe material and size, it was previously stated that the material for the probe membrane, through which the tritium diffuses, may be selected from any metal which is substantially inert to the environment in which the tritium concentration is being determined. It must also allow the diffusion of elemental hydrogen and tritium therethrough. While a number of materials can function as such depending upon the type of environment into which the probe will be inserted, it is preferred that the membrane be constructed from either iron, nickel or low-carbon steel, with nickel being preferred when the present invention is utilized to measure the tritium concentration in liquid sodium or other molten metals. In addition, two probe sizes, the probe being constructed in accordance with FIG. 2, were tested. One probe had a nickel membrane of 3.3 inches in length, 0.375 inch outer diameter and 0.015 inch thickness. The other probe membrane was 1.26 inches long, 0.375 inch outer diameter and 0.015 inch in thickness. While these sizes are not to limit the present invention, it is preferred that the probe have a metal tube through which the tritium will diffuse of from 5.0 inches to 1.0 inch in length.

As can be seen from the above discussion, the concentration of the hydrogen in the sweep gas, the flow rate of the sweep gas, the temperature of the probe and the tritium concentration in the sodium are all interrelated. However, if the temperature of the probe is maintained at about 750°F. or above, the sweep gas flow rate maintained at 0.1 milliliter per second or greater, and the hydrogen concentration in the sweep gas maintained at 0.1 percent or greater, a direct relationship between the amount of HT formed in the sweep gas and the amount of tritium in the liquid sodium results. In addition, a high diffusion rate of tritium through the membrane into the probe also results. Since the sweep gas flow rate, probe size, hydrogen concentration in the sweep gas and the temperature are maintained constant, the HT concentration in the sweep gas is only a function of the tritium concentration in the sodium. The results of calculations for the larger probe discussed above operating at 750° and 930°F. (the approximate temperatures of primary and secondary sodium in an LMFBR) in the dynamic mode are shown in Table I. The results obtained for the smaller probe at 900°F. are shown in Table II. The HT concentrations are also expressed as disintegrations/(sec) (milliliters of sweep gas), which is the tritium radioactivity counted in the ionization chamber. Typical tritium concentrations in liquid-metal-cooled nuclear reactors, such as the EBR-II, are about $10^{15}$ atoms/kg Na and $3 \times 10^{13}$ atoms/kg Na in the primary and secondary sodium, respectively. From Tables I and II it is evident that at the lower sweep gas flow rates, both probes would provide adequate amounts of tritium for counting at these tritium concentrations in the sodium.

TABLE I

| atoms /kg Na | Temp., °F. | Sweep-Gas Flow Rate, ml/sec | HT(partial pressure) from Probe, atm | Tritium Disintegration Rate, dps/ml of Sweep Gas |
|---|---|---|---|---|
| $9 \times 10^{14}$ | 750 | 0.1 | $1.19 \times 10^{-10}$ | 5.75 |
| | | 0.2 | $6.04 \times 10^{-11}$ | 2.9 |
| | | 0.5 | $2.44 \times 10^{-11}$ | 1.2 |
| | | 1.0 | $1.22 \times 10^{-11}$ | 0.6 |
| | 930 | 0.1 | $3.83 \times 10^{-10}$ | 18.5 |
| | | 0.2 | $2.04 \times 10^{-10}$ | 9.9 |
| | | 0.5 | $8.46 \times 10^{-11}$ | 4.1 |
| | | 1.0 | $4.28 \times 10^{-11}$ | 2.1 |

TABLE II

| $T_{Na}$ atoms /kg Na | Temp., °F. | Sweep-Gas Flow Rate, ml/sec | HT(partial pressure) from Probe, atm | Tritium Disintegration Rate, dps/ml of Sweep Gas |
|---|---|---|---|---|
| $9 \times 10^{14}$ | 900 | 0.05 | $2.53 \times 10^{-10}$ | 12.2 |
| | | 0.10 | $1.31 \times 10^{-10}$ | 6.35 |
| | | 0.20 | $0.67 \times 10^{-10}$ | 3.24 |

As stated above, any method for measuring the radioactivity of the tritium in the sweep gas can be utilized. However, in the examples given above and in the experimental work described below, an ionization chamber was utilized. In order to gain maximum sensitivity in the counting system, the ionization chamber, or chambers, were operated in the Geiger-Mueller region rather than in the proportional-counting region. Because of the high voltages (1,350–2,450 V) required in this particular counting mode, a quench gas, in this case methane as shown in FIG. 1, was introduced into the gas stream from the probe to reduce the large dead time of the counter.

The methane concentration necessary to maintain system stability and counting reproducibility is dependent on the applied voltage as well as the level of expected counting. In preliminary experiments, an external source of $^{226}Ra$ was used to demonstrate changes in counting efficiency while setting the electronic variables. A flowing gas mixture of known tritium concentration was then used to optimize counting conditions.

Table III presents the results obtained with two ionization chambers of 25 and 240 milliliters nominal volume for a mixture of tritium and hydrogen in argon. Although these data are limited, they do indicate that the counting efficiency is close to the expected value of 100 percent and that linearity of response is independent of a given chamber volume.

TABLE III

EFFECT OF COUNTING CHAMBER VOLUME ON COUNTING EFFICIENCY (Mixture used = ~0.5 mC tritium + 40 ppm $H_2$ in 1000 liters argon.)

| | T (cps) | Bkg. (cps) | cps (net) | cps/ml (net) |
|---|---|---|---|---|
| 25-ml counting chamber[a] | 736 | 4.2 | 732 | 29.3 |
| 240-ml counting chamber[a] | 7206 | 9.3 | 7197 | 30.0 |

*Conditions

Methane composition — 3.25%

Applied voltage — 2200 V (25 ml); 2000 V (240 ml)

Flow rate through ionization chamber = 42.2 ml/min

Single channel analyzer — integration mode.

The effects on counting of changes in hydrogen and methane concentrations in the gas stream were tested. Hydrogen was of interest because it is present at concentrations as high as 10 percent or more in the gas stream to the ionization chamber. At potentials below 2,300 V, no interferences were observed at hydrogen levels of 1.66 percent. At higher voltages and greater hydrogen concentrations, preliminary results indicated somewhat elevated count rates. Methane concentrations of less than about 3 percent produced a sharp increase in count rate due to a decrease in the quenching action of the methane. However, such elevated count rates due to higher hydrogen concentrations in the sweep gas can be adjusted for by calibrating the system against a standard tritium concentration in the high-temperature environment.

In accordance with the teachings above, a nickel probe constructed according to FIG. 2 was inserted into a liquid sodium loop and connected to a hydrogen-argon gas source and ionization counter as described in FIG. 1. About $2 \times 10^{14}$ atoms/kg Na of tritium was maintained in the liquid sodium, and the amount of hydrogen in the sweep gas was then varied. FIG. 4 shows the results of this particular experiment. As shown in FIG. 4, there were three individual events. The tritium concentration in the liquid sodium resulted in a fairly constant count rate of about 6,100 counts per minute with 1 percent hydrogen being present in the sweep gas. In event No. 1, the hydrogen content in the sweep gas was dropped from 1 percent to 0 percent, and as can be seen from FIG. 4, the count rate drops down near to zero. In event No. 2, the hydrogen concentration in the sweep gas was increased to 5 percent, and as can be seen from FIG. 4 the count rate increased extensively up to 26,000 counts per minute and then dropped off to about 1,800 counts per minute. In event No. 3, the hydrogen content was decreased from 5 percent back to 1 percent again, and as can be seen from FIG. 4, the count rate dropped down to approximately what it was in the beginning, within experimental error. This shows that the response of the present invention is, in fact, dependent on the hydrogen content in the sweep gas, and that the tritium diffusing through the wall of the probe is, in fact, reacting in a predictable manner with the hydrogen in the sweep gas.

In an experiment to determine the feasibility and operability of the present invention, tritium was introduced into a sodium loop in four doses of approximately 0.7 mCi each. During these injections, two probes were in operation in accordance with FIGS. 1 and 2 with two ionization chambers. Probe No. 1 is the smaller probe described above utilizing a 20-milliliter ionization chamber. Probe No. 2 is the larger probe described above utilizing an 85-milliliter ionization chamber. Tritium decay count rates at the ionization chambers were observed for the two probes and are shown in Table IV.

TABLE IV

| Probe No. | | Observed count rate (cps) | Net change |
|---|---|---|---|
| 1 | Background | 105 | — |
| | After Dose No. 1 | 185 | 80 |
| | After Dose No. 2 | 260 | 75 |
| | After Dose No. 3 | 380 | 120 |
| | After Dose No. 4 | 470 | 90 |
| 2 | Background | 45 | — |
| | After Dose No. 1 | 460 | 415 |
| | After Dose No. 2 | 1020 | 560 |
| | After Dose No. 3 | 3300 | 2280 |
| | After Dose No. 4 | 4750 | 1450 |

It should be noted that between doses 2 and 3, a major leak in the gas system for probe No. 2 was found and corrected. The net change on probe No. 2 between doses 3 and 4, that of 1,450 cps, compares favorably with about 1,200 which is one-fourth of the total change on probe No. 2. From the observed count rates and the net changes thereof shown in Table IV, it is clearly seen that the present invention is, in fact, an accurate method for detecting changes in the tritium concentration as well as measuring the tritium concentration itself. While the systems in the above experiment were not calibrated with the tritium and the sodium system to determine how many counts is equivalent to what particular concentration of tritium in the sodium, this would be a rather simple determination. Therefore, when utilizing the present invention, either the observed counts can be obtained and then mathematically converted to the corresponding tritium concentration in the sodium, or preferably the systems should be initially calibrated so that the observed counts are shown directly in relation to their corresponding tritium concentrations.

Utilizing the present invention on the primary and/or secondary sodium coolant systems of a liquid-sodium-cooled nuclear reactor, the tritium concentration in such sodium can be accurately and easily determined. In addition, the present invention enables the continual determination of such tritium concentrations so that the tritium concentration in the sodium can, in fact, be monitored and fluctuations of such concentrations be quickly and easily noted. The present invention enables the determination of tritium concentrations as low as $10^{-7}$ ppm. This results in an accuracy and precision much greater than the minimum required for such a method if it is to be effective when used with a sodium-cooled nuclear reactor. This method also has the advantage of simplicity and direct measurement of the tritium concentration without the requirement of subsequent calculations once the system has been initially calibrated. In addition, this particular method does not have the disadvantage of requiring the removal of sodium from the reactor system in order to make tritium concentration measurements, such prior art techniques being rather slow, imprecise and discontinuous.

While the present invention has been basically described in terms of measuring the tritium concentration in a molten metal environment, it can also be utilized to measure the tritium concentration in the cover gas of a liquid-sodium-cooled nuclear reactor as well as in other high-temperature environments. If, for example, the cover gas of a reactor is in equilibrium with the sodium coolant thereof, the present invention will give the same results as if it were being utilized in the sodium coolant, except that it would be measuring the tritium activity in lieu of the tritium concentration. However, since HT is also formed in the cover gas, whereas it is not formed in liquid sodium, the tritium activity and concentration may not be the same in the cover gas. Fortunately, the only additional problem involved with utilizing the present invention to measure the tritium concentration in a cover gas is that the hydrogen concentration in the cover gas may affect the determination of the tritium concentration due to HT formation, and this can be easily overcome if the hydrogen concentration in the cover gas is also known.

It will be understood that the invention is not to be limited to the details given herein but that it may be modified within the scope of the appended claims.

The embodiments of the invention in which an exclusive property or privilege is claimed are defined as follows:

1. A method of measuring the tritium concentration in a high-temperature environment comprising connecting an enclosed thin-wall metal membrane to a gas source comprising hydrogen in an inert carrier gas, said membrane being formed from a metal substantially inert to said environment and through which elemental hydrogen and tritium will diffuse; contacting the outer surface of said membrane with said environment; contacting and sweeping the interior surface of said membrane with the gas from said gas source whereby tritium atoms diffusing through the walls of said membrane react with the hydrogen in said gas at the interior surface of said membrane to form gaseous hydrogen-tritium molecules which are immediately swept away from said membrane's interior surface, thereby maintaining the tritium concentration at the interior surface of the membrane near zero; removing said gas containing gaseous hydrogen-tritium from said enclosed membrane; and measuring the radioactivity of the tritium present in said removed gas, the radioactivity measurement being indicative of the tritium concentration in said high-temperature environment.

2. The method according to claim 1 wherein said environment comprises molten metal or high-temperature gas.

3. The method according to claim 1 wherein said metal membrane is formed from a member selected from the group consisting of nickel, iron and low-carbon steel.

4. The method according to claim 1 wherein said gas contains at least 0.1 percent hydrogen.

5. The method according to claim 1 wherein the flow of said gas to said membrane is 0.1 to 1.0 ml/sec.

6. A method of measuring the tritium concentration in molten metal comprising connecting a closed end, tubular, thin-wall nickel probe to a gas source comprising hydrogen in an inert carrier gas; contacting the closed end and outer surface of said nickel probe with said molten metal whereby hydrogen and tritium present in said molten metal will diffuse through the wall of said probe; introducing the gas from said gas source into the interior of said probe to contact and sweep the interior surface of the probe with said gas to react the hydrogen in said gas with the diffused tritium at the interior surface of said probe to form gaseous hydrogen-tritium molecules, said gaseous hydrogen-tritium being immediately swept away from said probe's interior surface by said gas; removing said gas containing the gaseous hydrogen-tritium from said probe; and measuring the radioactivity of the tritium present in the removed gas, the radioactivity measurement being indicative of the tritium concentration in said molten metal.

7. The method according to claim 6 wherein said gas comprises at least 0.1 percent hydrogen in argon, the flow rate of said gas is 0.1 to 1.0 ml/sec, and the temperature of said probe is 750° to 1,200°F.

8. The method according to claim 6 wherein the gas from said gas source is introduced into the interior of said probe by connecting said gas source to a tube mounted coaxially within the interior of said probe, directing said gas through the interior and out the end of said tube, and then passing said gas between the exterior surface of said tube and the interior surface of said probe in a helical direction so as to contact and sweep the interior surface of said probe with said gas.

9. A method of monitoring the tritium concentration in the liquid sodium coolant of a sodium-cooled nuclear reactor comprising connecting a closed end, tubular, thin-wall nickel probe to a hydrogen-argon gas source; contacting the closed end and outer surface of said probe with said liquid-sodium coolant whereby hydrogen and tritium present in said coolant diffuse through the walls of said probe; continuously introducing the hydrogen-argon gas into the interior of said probe to contact and sweep the interior surface of the probe with said gas to react the hydrogen in said gas with any diffused tritium at the interior surface of said probe to form gaseous hydrogen-tritium molecules, said gaseous hydrogen-tritium being immediately swept away from the interior surface of said probe by the hydrogen-argon gas; continually removing said hydrogen-argon gas containing gaseous hydrogen-tritium from said probe; and measuring the radioactivity of any tritium present in the removed gas, the radioactivity measurement being indicative of the tritium concentration in said liquid sodium coolant with fluctuations in said radioactivity measurement indicating corresponding fluctuations in the sodium coolant's tritium concentration.

10. The method according to claim 9 wherein said hydrogen-argon gas contains 0.1 to 10 percent hydrogen in argon, the flow rate of said gas is 0.1 to 1.0 ml/sec, and the temperature of said probe is 750° to 1,200°F.

* * * * *